(12) United States Patent
Brewington et al.

(10) Patent No.: US 8,848,983 B1
(45) Date of Patent: Sep. 30, 2014

(54) SYSTEM AND METHOD FOR RANKING GEOGRAPHIC FEATURES USING VIEWSHED ANALYSIS

(75) Inventors: Brian Edmond Brewington, Fort Collins, CO (US); Mark A. Limber, Boulder, CO (US); Igor V. Guskov, Ann Arbor, MI (US); Peter Hamel, Boulder, CO (US); Kong M. Cheung, San Francisco, CA (US); Morten Just Petersen, Zurich (CH)

(73) Assignee: Google Inc., Mountain View, CA (US)

( * ) Notice: Subject to any disclaimer, the term of this patent is extended or adjusted under 35 U.S.C. 154(b) by 257 days.

(21) Appl. No.: 13/484,996

(22) Filed: May 31, 2012

(51) Int. Cl.
*G06K 9/00* (2006.01)
*H04N 7/18* (2006.01)

(52) U.S. Cl.
USPC ............................ 382/109; 382/154; 348/135

(58) Field of Classification Search
USPC ......... 382/100, 108, 109, 113, 198, 286, 288, 382/154; 348/85, 135, 144; 707/723, 724, 707/729
See application file for complete search history.

(56) References Cited

U.S. PATENT DOCUMENTS

| | | | |
|---|---|---|---|
| 5,442,557 A | 8/1995 | Kaneko | |
| 5,528,518 A | 6/1996 | Bradshaw et al. | |
| 7,571,146 B2 * | 8/2009 | Dalton | 706/45 |
| 7,792,883 B2 | 9/2010 | Buron et al. | |
| 7,933,897 B2 | 4/2011 | Jones et al. | |
| 8,015,183 B2 * | 9/2011 | Frank | 707/724 |
| 2006/0271281 A1 | 11/2006 | Ahn et al. | |
| 2009/0138445 A1 * | 5/2009 | White et al. | 707/3 |
| 2010/0299303 A1 * | 11/2010 | Horster et al. | 706/52 |
| 2012/0323798 A1 * | 12/2012 | Den Herder et al. | 705/306 |

* cited by examiner

*Primary Examiner* — Yon Couso
(74) *Attorney, Agent, or Firm* — Dority & Manning, P.A.

(57) ABSTRACT

Systems and methods for ranking geographic features in a geographic information system are provided. In particular, geographic features can be assigned ranking scores based on characteristics of viewsheds associated with the geographic features. In particular, characteristics of a viewshed associated with a geographic feature can be analyzed to assess the visibility of the geographic feature. A ranking score can be assigned to the geographic feature based on the characteristics of the viewshed. The ranking score can be used prioritize information in a geographic information system.

18 Claims, 8 Drawing Sheets

SYSTEM AND METHOD FOR RANKING GEOGRAPHIC FEATURES USING VIEWSHED ANALYSIS

FIELD

The present disclosure relates generally to ranking geographic features, and more particularly to a system and method for ranking geographic features using a viewshed analysis.

BACKGROUND

Geographic information systems and other information systems provide for the archiving, retrieving, and manipulation of data that has been indexed and stored according to geographic coordinates associated with the data. Geographic information systems can include a variety of different data types, such as imagery, maps, annotations, tables, documents, and other information. Geographic information systems typically include data associated with specific geographic features, such as structures, buildings, landmarks, stadiums, arenas, parks, mountains, bodies of water, and other geographic features.

Due to the volume of data available in many geographic information systems, it can be desirable to rank or prioritize information associated with geographic features. For instance, it can be desirable to rank or prioritize information associated with geographic features in geographic search applications to prioritize search results associated with search queries. The rankings can also be used in query by photo applications, such as the Google Goggles query by photo services provided by Google Inc., to identify geographic features depicted in photographs or other imagery and to determine what information to provide in association with the imagery. In other applications, the rankings associated with the geographic features can be used to determine what information to display in geographic imagery, such as map imagery, street level imagery, three-dimensional geographic imagery, or other imagery.

SUMMARY

Aspects and advantages of the invention will be set forth in part in the following description, or may be obvious from the description, or may be learned through practice of the invention.

One exemplary aspect of the present disclosure is directed to a computer-implemented method for determining ranking data for geographic features. The method includes identifying a geographic feature associated with a geographic area and determining, with a computing device, a viewshed associated with the geographic feature. The viewshed can include a set of points in a space, such as a three dimensional space, from which at least a portion of the geographic feature is visible and/or a set of points in a space that are visible from at least a portion of the geographic feature. The method includes evaluating one or more characteristics of the viewshed associated with the geographic feature and generating a ranking score for the geographic feature based at least in part on the one or more characteristics of the viewshed. The method further includes storing the ranking score for the geographic feature in a memory so that the ranking score can be accessed, for instance, to prioritize search results or to prioritize information for display in a user interface.

Other exemplary implementations of the present disclosure are directed to systems, apparatus, computer-readable media, devices, and user interfaces for ranking or prioritizing information associated with geographic features.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for ranking geographic features in a geographic information system. In particular, geographic features can be assigned ranking scores based on characteristics of viewsheds associated with the geographic features. The viewshed of a geographic feature includes a set of points in a space, such as a three dimensional space, from which at least a portion of the geographic feature is visible and/or a set of points in a space visible from at least a portion of the geographic feature.

Figure 1:
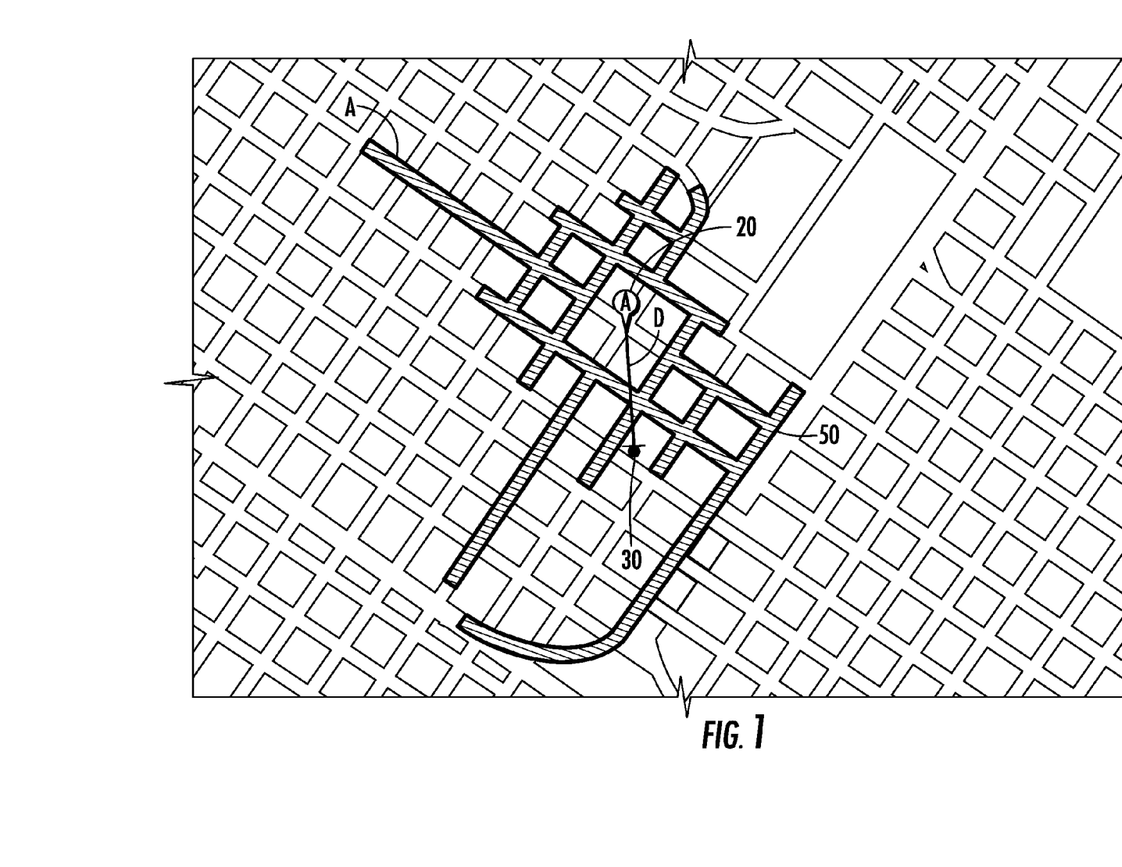
FIG. 1 depicts an exemplary viewshed for a geographic feature according to an exemplary embodiment of the present disclosure.

FIG. 1 depicts a representation of an exemplary viewshed 50 for geographic feature 20 determined according to an exemplary embodiment of the present disclosure. The viewshed 50 is presented for discussion and illustrative purposes only and may not represent an actual viewshed determined for geographic feature 20. The viewshed 50 includes the set of points in a space from which the geographic feature 20 is visible. The shaded regions represent points from which at least a portion of the geographic feature 20 is visible. The viewshed 50 has been determined based on test points along streets and other traversable paths proximate the geographic feature. As shown, the viewshed has a complex shape as a result of the geographic feature 20 being occluded by other objects, such as other buildings proximate the geographic feature 20.

According to aspects of the present disclosure, characteristics of a viewshed associated with a geographic feature can be analyzed to assess the visibility of the geographic feature. A ranking score can be assigned to the geographic feature based on the characteristics of the viewshed. The ranking score can be used to prioritize information in a geographic information system. As a result, the subject matter of the present disclosure has the technical effect of ranking and prioritizing geographic features in a geographic information system based on their visibility relative to other geographic features.

The viewshed of a geographic feature can be determined, for instance, by accessing a three dimensional model associated with the geographic area where the geographic feature is located. The model can include a three dimensional representation of the geographic feature. In one embodiment, the three dimensional model can be a stereo mesh model of the geographic area that includes a plurality of mesh triangles associated with the geographic feature. The model can also include or can have access to synthetic models of geographic features in the geographic area, such as the synthetic models provided in a virtual globe application. The model can also include textures mapped to the surfaces in the three dimensional models. The textures can include photographs or other imagery associated with the geographic area, and can depict geographic objects such as trees (with or without leaves) bridge trestles, and other structures that can occlude the visibility of geographic features in the geographic area.

The visibility of the three dimensional representation of the geographic feature can be assessed from a plurality of different geographic points in a three dimensional space within the three dimensional model. For instance, for each geographic point, it can be determined whether the three dimensional representation of the geographic feature is visible from the geographic point. If so, the geographic point is included in the viewshed of the geographic feature.

In one implementation, a geographic point can be included in the viewshed only if greater than a predefined threshold of the three dimensional representation of the geographic feature is visible from the geographic point. The threshold can be based on any suitable metric associated with the visibility of the geographic feature. For example, the threshold can be based on the visible surface area of the geographic feature such that if greater than a predefined surface area of the geographic feature is visible from a geographic point, the geographic point can be included in the viewshed. As another example, the threshold can be based on the solid angle in steradians subtended by the feature for a given view of the geographic feature from a geographic point such that if greater than a predefined solid angle in steradians is visible from the geographic point, the geographic point is included in the viewshed.

Once the viewshed of the geographic feature has been determined, characteristics of the viewshed can be evaluated and used to determine a ranking score for the geographic feature. At least two characteristics of a viewshed can provide a good measure of a geographic feature's prominence over a wide geographic area: (1) the size of the viewshed; and (2) how much the viewshed is skewed. The size of the viewshed provides a measure of how far the geographic feature is visible. The size of the viewshed can be determined, for instance, by determining the total area of the viewshed. For instance, referring to the viewshed 50 depicted in FIG. 1, the total area A of the viewshed can be evaluated and used to determine a ranking score for the geographic feature.

The amount a viewshed is skewed can be determined, for instance, by determining the distance from the geographic feature to a centroid of its associated viewshed. For instance, referring to the viewshed 50 of FIG. 1, the amount the viewshed 50 is skewed can be determined by evaluating the distance D from the geographic feature 20 to the centroid 30 of the viewshed 50. This metric can be important to boost the ranking of partially obscured but very tall geographic features. For instance, a mountain or skyscraper can be partially occluded by other geographic features in front of the mountain or skyscraper. In this case, geographic points relatively close to the mountain or skyscraper may not be included in the viewshed due to the presence of other geographic features blocking the view of the mountain or skyscraper. However, the mountain or skyscraper is typically visible from all directions and should be afforded a relatively high ranking score.

Other characteristics representative of the visibility of a geographic feature can also be used to determine the ranking score for the geographic feature. For instance, the height, volume, and/or volume weighted height of a geographic feature can be used to determine the ranking associated with geographic feature.

Once the ranking score for a geographic feature has been determined, the ranking score can be stored in a memory for later use. The ranking score can be used in a variety of applications. In one application, the ranking score can be used to prioritize search results in a search application. In another application, the ranking score can be used to prioritize information for display in geographic imagery, such as map imagery, street level imagery, satellite imagery, and other geographic imagery. For instance, the ranking score can be used to determine what text annotations to display at a particular view or zoom level of the geographic imagery.

In another exemplary application, the ranking score can be used to identify features in a query by photo application, such as the Google Goggles query by photo services provided by Google Inc. For instance, a photo or other image of a geographic area can depict a plurality of different geographic features. The ranking scores associated with these geographic features can be used to determine what information to display in response to the query by photo. For instance, in photos or other images that depict a large number of geographic features, the ranking score associated with the geographic features can be used to identify the most prominent features depicted in the photo or other imagery. Information can then be provided for the more prominent features.

In certain applications, it can be desirable to determine a ranking score for a geographic feature based only on a local sample of the viewshed associated with the geographic feature. In particular, it can be desirable to identify which feature in a geographic area is most prominent given that the geographic feature is being observed only from a particular restricted region, such as along a travel route or from a direction associated with the particular view of the geographic imagery. In these cases, a local sample of the viewshed associated with the geographic feature can be used to determine the ranking score of the geographic feature. The local sample can be determined, for instance, based on geographic points associated with a particular view direction of the imagery or based on geographic points along a travel route.

The viewshed information for geographic features determined according to aspects of the present disclosure can be used in association with applications other than generating a ranking score. As one example, the viewshed information can be used to determine when to display information in a mobile navigation application. For instance, the mobile navigation application can display information associated with a geographic feature only when a user has traveled to a geographic point where the viewshed associated with the geographic feature indicates that the geographic feature is visible. In this manner, the viewshed information can be used to control the display of information in a geographic information system based on the visibility of geographic features in a geographic area.

Figure 2:
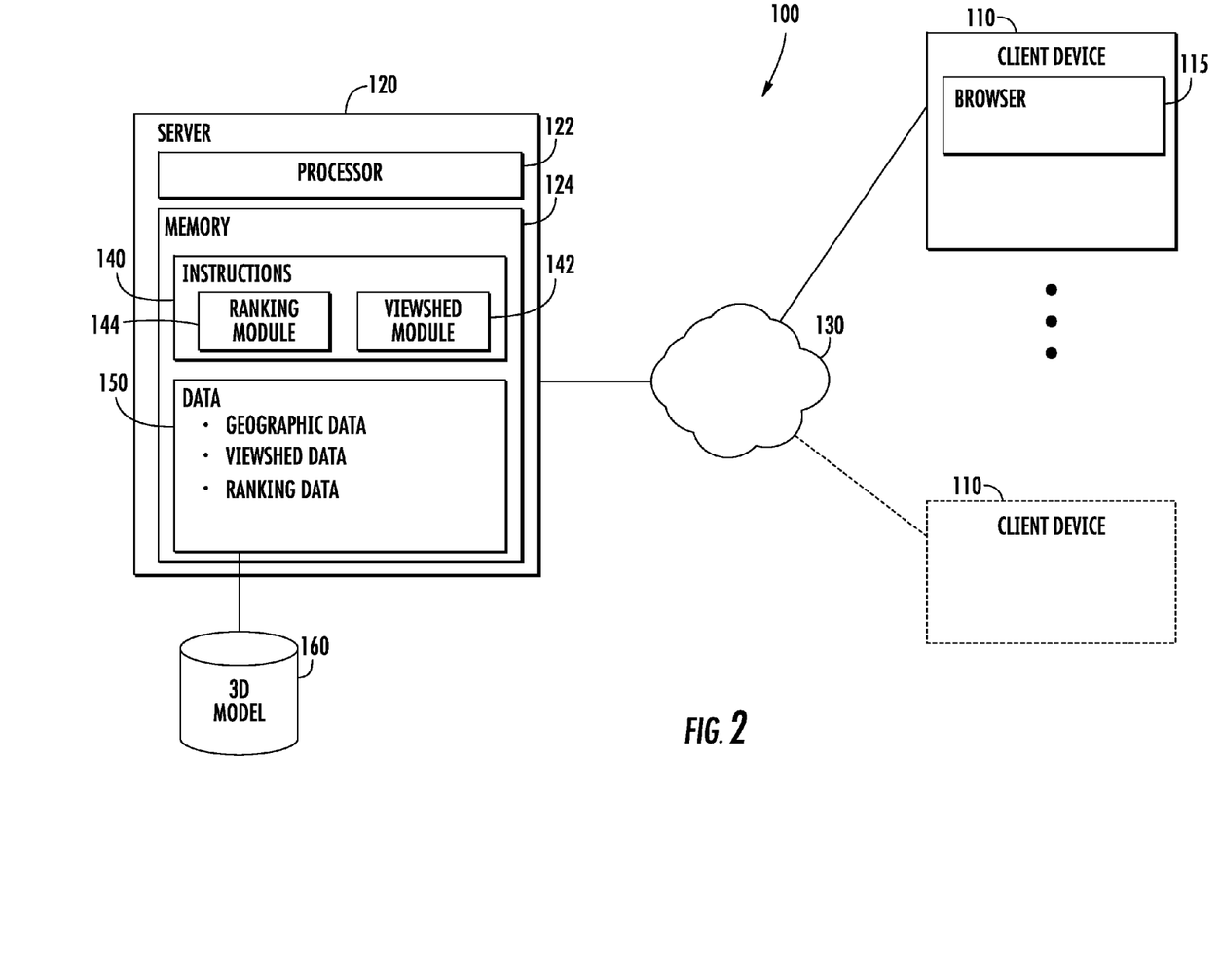
FIG. 2 depicts an exemplary computing system that can be used to rank or prioritize geographic information according to exemplary embodiments of the present disclosure.

FIG. 2 depicts a block diagram of an exemplary computing system 100 configured to generate ranking data for geographic features based on viewshed information according to an exemplary embodiment of the present disclosure. As illustrated, the computing system 100 includes one or more client devices 110 connected to a server 120 over a network 130. Users of the client devices 110 can send requests for information, such as geographic information, to the server 120. The server 120 can respond to the requests by providing information over the network 130. For instance, a user of a client device 110 can send a request for geographic imagery or other query to server 120 over network 130 and server 120 can respond to the request by sending the geographic imagery and/or other responsive data to the client device 110 over network 130.

Network 130 can include any number of wired or wireless communication links for coupling together computing devices or other nodes. For instance, network 130 can include one or more of a cellular network, WiFi network, LAN, WAN, the Internet, and/or other suitable network. Server 120 can include a network interface to allow communications with the client devices 110 over network 130. Similarly, client device 110 can include a network interface to allow communication with the server 120 over the network 130. The server 120 and the client device 110 can exchange information over the network 130 in any suitable format such as HTML code, XML messages, WAP code, Flash, Java applets, xhtml, plain text, voiceXML, VoxML, VXML, or other suitable format.

Server 120 can include any computing device configured to exchange information with the client device(s) 110. In one embodiment, the server 120 can be a web server that can host web pages, web sites, web applications, and/or other server-client applications. For instance, server 120 can host one or more geographic information system applications, such as search applications, mapping/navigation applications, virtual globe applications, image recognition applications, query by photo applications, or other suitable applications that can provide information associated with one or more geographic features in a geographic area.

Server 120 can include one or more processors 122 and a memory 124. The processor(s) 122 can be any known processing device, such as a microprocessor, digital signal processor, or other suitable processing device. Memory 124 can include any suitable computer-readable medium or media, including, but not limited to volatile memory, non-volatile memory, RAM, ROM, hard drives, flash drives, magnetic and optical storage devices, or other memory devices.

Memory 124 can store information accessible by processor(s) 122, including computer-readable instructions 140 that can be executed by processor(s) 122. The instructions 140 can be any set of instructions that when executed by processor(s) 122 cause the processor(s) 122 to provide desired functionality, such as providing information responsive to requests from the client device(s) 110. The instructions 140 can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

As shown in FIG. 2, the processor 122 can execute instructions 140 to implement a viewshed module 142 and a ranking module 144. As used herein, the term "module" refers to computer logic used to provide specified functionality and can be implemented by executing any suitable form of computer-readable instructions. The viewshed module 142 can be configured to determine viewshed information for geographic features. For instance, as will be discussed in more detail below, the viewshed module 142 can analyze the visibility of a particular geographic feature from a variety of different geographic points to identify the viewshed associated with the geographic feature.

The ranking module 144 can be configured to evaluate one or more characteristics of a geographic feature's viewshed and assign the geographic feature a ranking score based on the evaluated characteristics. For instance, the ranking modules can evaluate the size and the degree to which the viewshed of a geographic feature is skewed to determine a ranking score for the geographic feature. The ranking score can be used to prioritize information provided by server 120 responsive to requests from the client devices 110.

Memory 124 can also store data 150 that can be accessed and/or manipulated by processor(s) 122. For instance, the memory 124 can store geographic data that can include maps, tables, street level images, satellite images, virtual globes, geographic feature information, annotations, and other data that is indexed by geographic coordinates. Memory 124 can also store viewshed data associated with geographic features. For instance, once the viewshed module 142 has identified a viewshed for a geographic feature, the viewshed and associated data can be stored in the memory 124 for later use. Memory 124 can also store ranking data for the geographic features. For instance, once the ranking module has assigned a ranking score to geographic features, the ranking scores can be stored as ranking data in the memory 124.

As illustrated, data 150 can also include or have access to a three dimensional model 160 associated with a geographic area. The three dimensional model can be, for instance, a stereo mesh model generated from a plurality of photographs and gathered spatial data collected for a geographic region. As will be discussed in more detail below, the three dimensional model 160 can be accessed by the viewshed module 142 to identify which geographic points are included in a geographic feature's viewshed.

The data 150 can be stored in one or more databases. The databases can be split up so they are in multiple locales. The databases data can be coupled to server 120 through a high bandwidth LAN or WAN or through network 130.

The client device 110 can generally include any node on the network 130 that includes computational ability and that can communicate with server 120. For instance, the client device 110 can be a personal computer, smartphone, desktop, laptop, smart device, PDA, tablet, or other computing device. The client device 110 can include a processor and a memory and can include appropriate input and output devices, such as a display screen, touch screen, touch pad, data entry keys, speakers, and/or microphone suitable for voice recognition. The client device 110 can be configured to display information to users through a suitable user interface.

Client device 110 can host a browser 115 which can be any application that can display information received from server 120. Browser 115 can allow a user to browse and interact with web pages, web sites, web-based applications, and other client-server applications. For instance, browser 115 can allow a user to navigate geographic information provided by server 120 to the client device 110 responsive to a request from the client device 110 over the network 130.

While FIG. 2 illustrates one example of a computing system 100 that can be used in accordance with aspects of the present disclosure, those of ordinary skill in the art, using the disclosures provided herein, will recognize that the inherent flexibility of computer-based systems allows for a great variety of possible configurations, combinations, and divisions of tasks and functionality between and among the components. For instance, the methods discuss herein can be implemented using a single computing device or across multiple computing devices.

Figure 3:
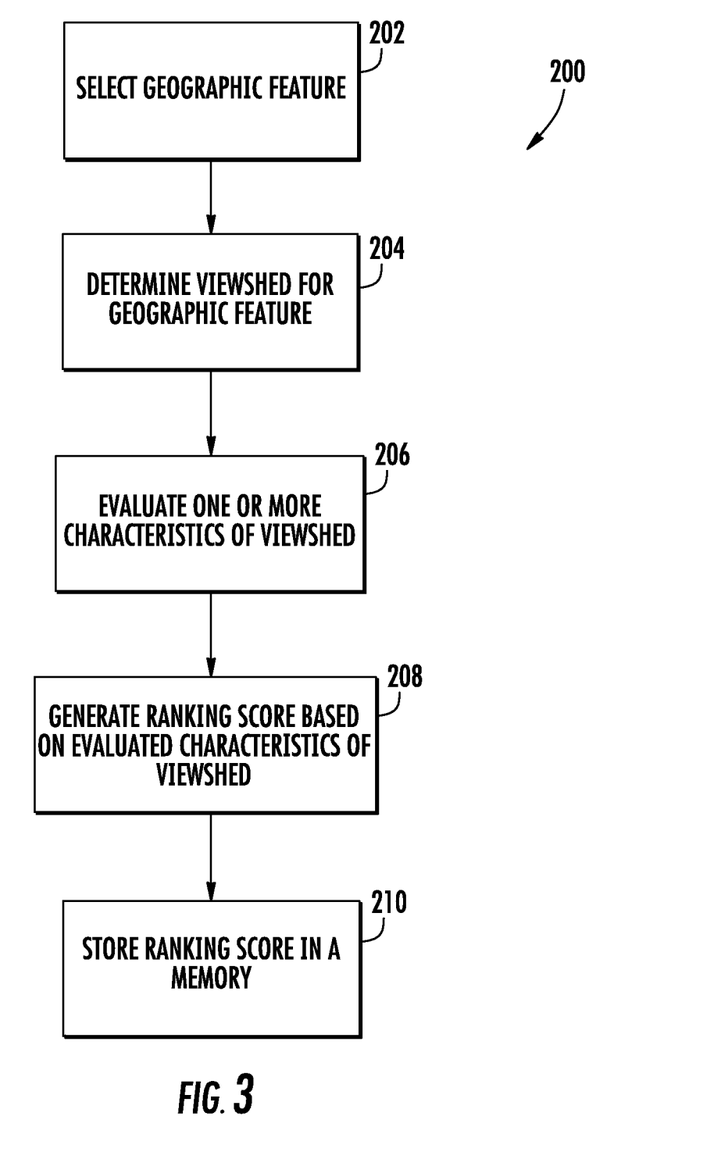
FIG. 3 depicts a flow diagram of an exemplary method according to an exemplary embodiment of the present disclosure.

FIG. 3 depicts a flow chart of an exemplary computer-implemented method (200) that can be used to generate a ranking score for one or more geographic features in a geographic information system according to an exemplary embodiment of the present disclosure. The exemplary method (200) can be implemented using any suitable processing device, such as the processor 122 of FIG. 2. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined and/or adapted in various ways without deviating from the scope of the present disclosure.

At (202), the method includes selecting a particular geographic feature in a geographic information system for which to generate a ranking score. More specifically, a particular geographic feature of a set of geographic features for which a ranking score is desired can be selected for analysis. For example, as part of enriching the data associated with a geographic information system, it can be desirable to generate ranking data that includes a ranking score for all or a predefined subset of all geographic features in a particular geographic area. At (202), the method can identify or select a particular geographic feature for analysis. Once a ranking score has been generated for the particular geographic feature, the next geographic feature in the set of geographic features for which a ranking score is desired can be selected for analysis. As will be discussed below, the generated ranking data can be stored in a memory for later access by the geographic information system.

At (204), the method includes determining the viewshed for the identified geographic feature. As discussed above, the viewshed for the geographic feature is a set of points in a space, such as a three dimensional space from which at least a portion of the geographic feature is visible and/or a set of points which are visible from at least a portion of the geographic feature. The viewshed can be determined based on any predefined set of geographic points. For instance, the viewshed can be determined based on a set of geographic points along roads and/or other traversable paths proximate the geographic feature. In addition, in one embodiment, a point can be considered to be within the viewshed only if a greater than a predefined threshold of the geographic feature is visible from the point.

Figure 4:
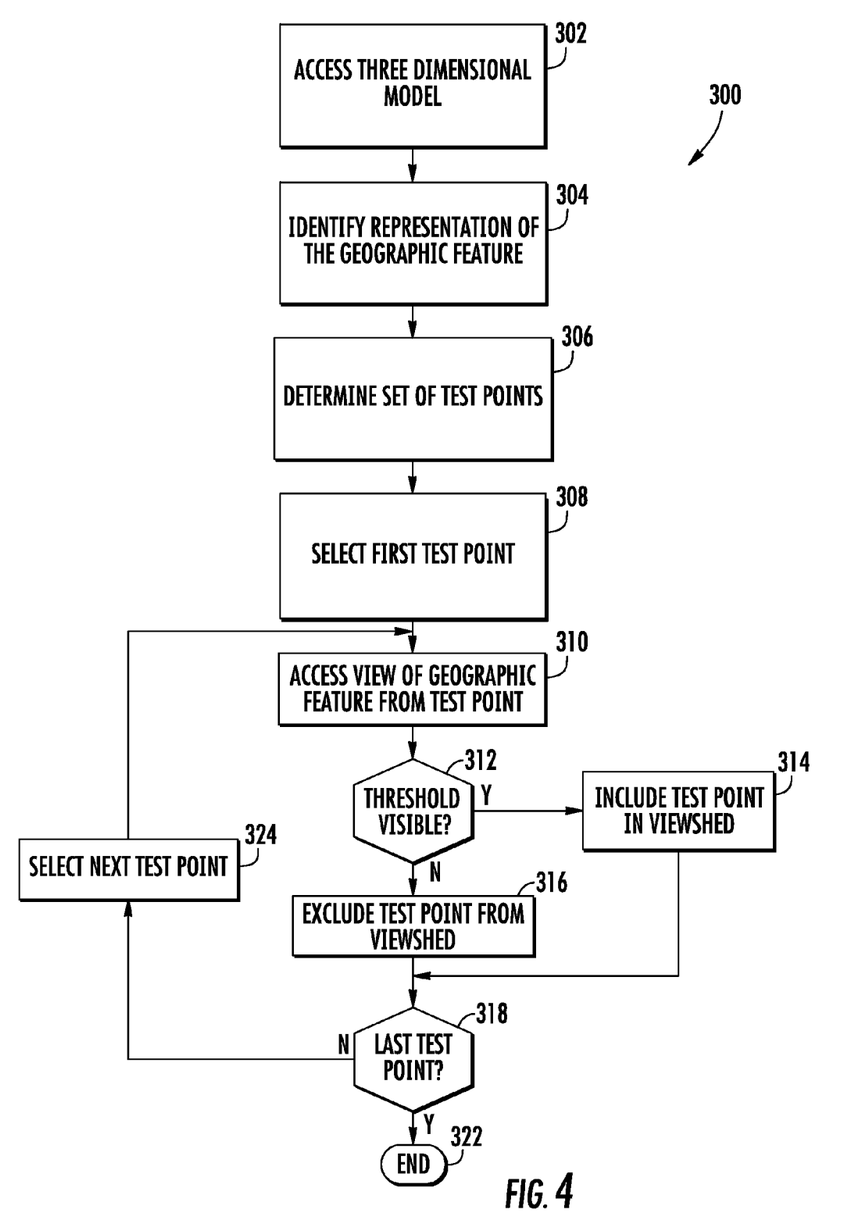
FIG. 4 depicts a flow diagram of an exemplary method for determining a viewshed for a geographic feature according to an exemplary embodiment of the present disclosure.

Referring to FIG. 4, one exemplary method (300) that can be used to determine the viewshed for an identified geographic feature will be discussed in detail. At (302), the method includes accessing a three dimensional model of the geographic area where the geographic feature is located. For instance, the method can include accessing the three dimensional model 160 of FIG. 2. The three dimensional model can include three dimensional representations of geographic features in the geographic area. The viewshed of a geographic feature can be determined by analyzing the visibility of the three dimensional representation of the geographic feature of interest in the three dimensional model from different geographic points within the model.

In one embodiment, the three-dimensional model can include a stereo mesh representation of the geographic area that includes a plurality of mesh triangles associated with features in the three dimensional model. The stereo mesh model can be constructed or generated using a plurality of suitable techniques. For instance, the stereo mesh model can be generated from a plurality of photographs of a geographic area using stereoscopic techniques. The three dimensional model can also be generated based on depth data collected from a geographic area, for instance, by a laser range finder.

Alternatively or in addition to the stereo mesh model, the three-dimensional model can include one or more synthetic models of buildings, objects, and/or terrain in the geographic area. For instance, the three dimensional model can include or have access to synthetic models of buildings and objects provided in a virtual globe application, such as the synthetic three dimensional models of buildings and objects provided in Google Earth.

The three dimensional model can also include textures mapped to the three dimensional surfaces of the objects depicted in the three dimensional model. The textures can be based on photographs or other imagery, such as satellite imagery, of the geographic area. The textures can include trees and other objects that may occlude the visibility of geographic features. The textures can be time based or seasonal. For instance, in one embodiment, a first texture can include trees in the winter without leaves and a second texture can include trees in the summer with leaves. Geographic features may be more visible in the winter than in the summer due to the absence of leaves on trees. The viewshed of a geographic feature can be assessed at different times (e.g. seasonally) using different textures in the geographic model to take into account these changes in visibility.

Figure 5:
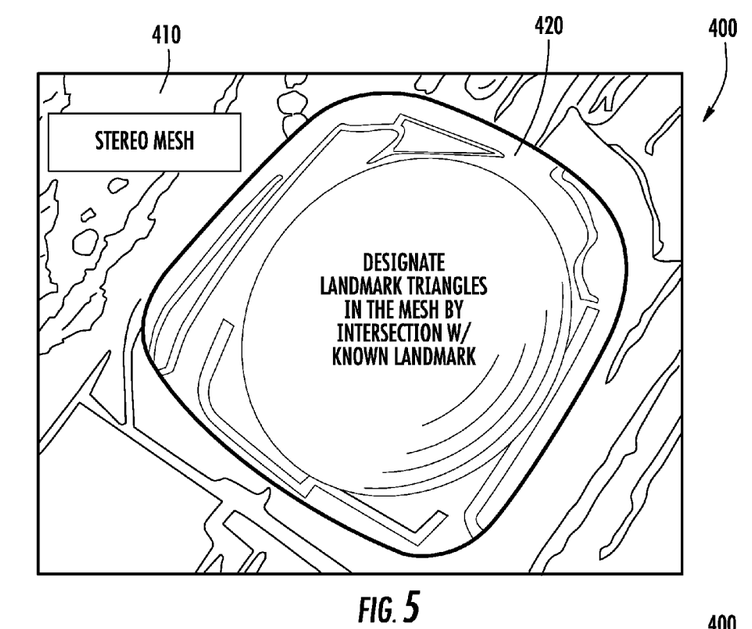
FIG. 5 depicts an exemplary three dimensional model that can be used to determine viewshed information for a geographic feature according to an exemplary embodiment of the present disclosure.

At (304), the method includes identifying a three dimensional representation of the geographic feature of interest in the three dimensional model. For instance, FIG. 5 depicts an exemplary three dimensional model 400 of a geographic area 410 according to an exemplary embodiment of the present disclosure. The three dimensional model 400 includes a plurality of mesh triangles associated with various geographic features in the geographic area 410. Each of the mesh triangles can be associated with specific geographic coordinates. Certain of the mesh triangles are associated with the geographic feature of interest, in this example, the geographic feature 420. The mesh triangles associated with the geographic feature 420 can be identified by cross referencing geographic coordinates associated with the mesh triangles with known locations of landmarks determined from a geographic information system, such as from vector representations of landmarks in a maps or other geographic information application.

Once the three dimensional representation of the geographic feature has been identified, the method includes determining a set of test points for analyzing the viewshed associated with the geographic feature (306). The set of test points includes specific geographic points in the geographic area proximate the geographic feature from which the visibility of the three dimensional representation of the geographic feature in the three dimensional model is assessed. The number and location of the test points can be set based on a desired resolution for the viewshed analysis. For instance, a high resolution analysis can include a relatively high number test points in the geographic area proximate the geographic feature. A low resolution analysis can include a relatively low number of test points in the geographic area proximate the geographic feature.

In one exemplary embodiment, the set of test points includes geographic points located along streets, transit routes, and other traversable paths proximate the geographic feature. In this embodiment, the viewshed of the geographic feature will include the set of geographic points along the traversable paths proximate the geographic feature from which at least a portion of the geographic is visible. Restricting the viewshed analysis to points along traversable paths proximate the geographic feature can facilitate the viewshed analysis by reducing the number of geographic points necessary to include in the viewshed analysis. Moreover, using points along traversable paths will capture visibility information of a geographic feature that can be most relevant to travelers and other users.

Figure 6:
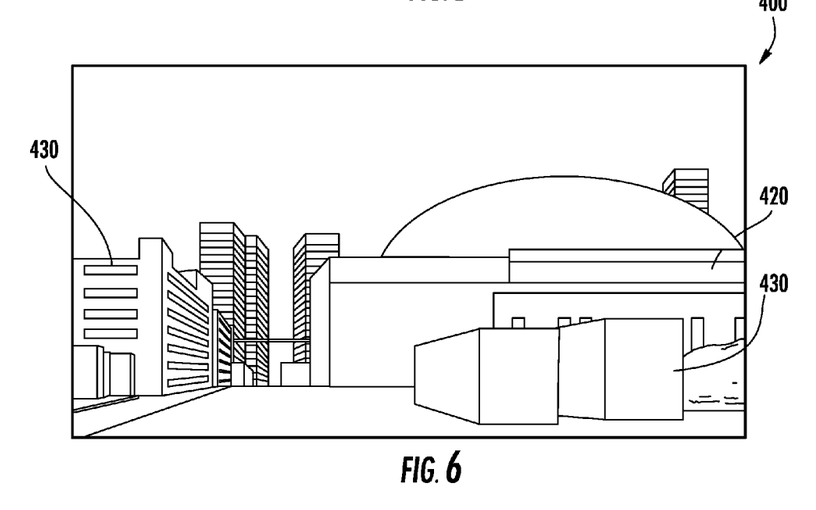
FIG. 6 depicts an exemplary view of a three dimensional representation of a geographic feature from a particular geographic point in the three dimensional model according to an exemplary embodiment of the present disclosure.

Once the set of test points has been determined, the method selects the first test point in the set (308) for analysis. A view of the geographic feature of interest from the test point in the three dimensional model is accessed at (310). FIG. 6 depicts an exemplary view of the three dimensional representation of the geographic feature 420 from a test point. As shown in FIG. 6, the view includes synthetic models of the geographic feature 420 as well as synthetic models of other buildings 430. Certain of the buildings 430 partially occlude the geographic feature 420.

After accessing the view from the test point, the view of the geographic feature from the test point can be analyzed to determine if greater than a predefined threshold of the geographic feature is visible from the test point as shown at (312) of FIG. 4. If greater than a predefined threshold of the geographic feature is visible, the test point is included in the viewshed associated with geographic feature (314). Otherwise, the test point is not included in the viewshed for the geographic feature (316).

The predefined threshold can be based on any suitable metric. For instance, in one example, the predefined threshold can be based on the visible surface area of the geographic object. If the visible surface area exceeds a predefined threshold, the test point can be included in the viewshed. In another example, the threshold can be based on the solid angle in steradians subtended to the view of the geographic feature from the test point. If the solid angle exceeds a predefined threshold, the test point can be included in the viewshed. In another example, the threshold can be based on a percentage of the geographic feature that is visible from the test point. If greater than a predefined percentage of the geographic feature is visible, the test point can be included in the viewshed.

The predefined threshold can also be set to any suitable value. The greater the threshold, the more restrictive the viewshed for the geographic feature. The lower the threshold, the less restrictive the viewshed for the geographic feature. In one embodiment, the predefined threshold can be set to a zero or null value such that if any portion of the geographic feature is visible from the test point, the test point is included in the viewshed.

Referring to the example of FIG. 6, a portion of the geographic feature 420 is partially occluded by other objects, such as buildings 430. However, the geographic feature 420 is still visible from the test point. If the visible portion of the geographic feature 420 exceeds a predefined percentage or threshold, the test point associated with the view of FIG. 6 will be included in the viewshed.

As shown in FIG. 4, once a determination has been made as to whether to include a test point in the viewshed of a geographic feature, the method determines whether the test point is the last test point in the set of test points (318). If so, the method (300) terminates and the viewshed for a geographic feature has been determined (322). Otherwise, the next test point in set of test points is selected (324) and visibility analysis techniques for the new test point are repeated until an analysis has been completed for all test points in the set of test points.

While FIG. 4 depicts one exemplary method for determining a viewshed associated with a geographic feature, other techniques for determining the viewshed can be used without deviating from the scope of the present disclosure. For instance, in an alternative embodiment, the viewshed of a geographic region can be determined by identifying all of the geographic points that are visible from different portions of the geographic feature, such as from different sides of the geographic feature. In another embodiment, the viewshed of a geographic area can be estimated based on one or more of the height and/or volume of the geographic feature. For instance, taller objects can be estimated to have larger viewsheds than shorter objects. Similarly, tall objects with high volume can be estimated to have larger viewsheds than tall objects with low volume.

As discussed above, FIG. 1 depicts a representation of an exemplary viewshed 50 for a geographic feature 20 determined according to an exemplary embodiment of the present disclosure. As shown, the viewshed 50 of the geographic feature 20 has been determined based on test points along streets and other traversable paths proximate the geographic feature 20. As shown, the viewshed has a complex shape as a result of the geographic feature 20 being occluded by other objects. Ranking data can be generated for the geographic feature 20 based on characteristics of the viewshed 50.

In particular, referring back to FIG. 3 at (206), one or more characteristics of the viewshed are evaluated to assess the predominance of the geographic feature in the geographic area. In one embodiment, the evaluated characteristics of the viewshed can include: (1) the size of the viewshed; and (2) the amount the viewshed is skewed. The size of the viewshed provides an indication of the range of visibility of the geographic feature. The size of the viewshed can be evaluated by determining the total area of the viewshed. For instance, the viewshed 50 depicted in FIG. 1 has a total area A. The larger the total area of the viewshed, the more prominent the geographic feature is in the geographic area. The smaller the total area of the viewshed, the less prominent the geographic feature is in the geographic area.

The amount the viewshed is skewed can be important to determine the prominence of a partially occluded geographic feature. For instance, a prominent geographic feature may be visible from a large distance from one direction, but less visible from another direction due to other structures or geographic objects occluding the view of the geographic feature.

The amount the viewshed is skewed can be used to boost the ranking of partially occluded geographic features. The amount the viewshed is skewed can be evaluated, for instance, by determining the distance from a centroid of the viewshed to the geographic feature. For instance, the amount the viewshed 50 of FIG. 1 is skewed can be determined based on the distance D from the centroid 30 of the viewshed 50 to the geographic feature 20.

Once the characteristics of the viewshed have been evaluated, a ranking score can be generated for the geographic feature based on the characteristics of the viewshed as shown at (208) of FIG. 2. The ranking score can be generated using any possible function or relationship between the ranking score and the evaluated characteristics of the viewshed. For instance, in one embodiment, the ranking score can be determined based on a linear relationship between the total area of the viewshed and the distance of the centroid of the viewshed from the geographic feature. Other suitable relationships can be used, such as quadratic, exponential or other suitable relationships. Moreover, different weights can be assigned to characteristics of the viewshed by adjusting the values of constants or other weights associated with the characteristics of the viewshed.

Other characteristics can be used in addition to the characteristics of the viewshed in assigning the ranking scores to the geographic features. For instance, information such the height and volume of the geographic feature can be used to determine a ranking score for the geographic features. Other information can include the amount of information or data associated with the geographic feature, number of search queries associated with the geographic feature, and user information optionally provided by a user of the geographic information system.

After the ranking score for the geographic feature has been generated, the ranking score can be stored in a memory (210) for later use. For instance, a server associated with a geographic information system can store the rankings in a memory and can access the ranking scores for a plurality of geographic features when providing geographic information over a network to one or more client devices.

Figure 7:
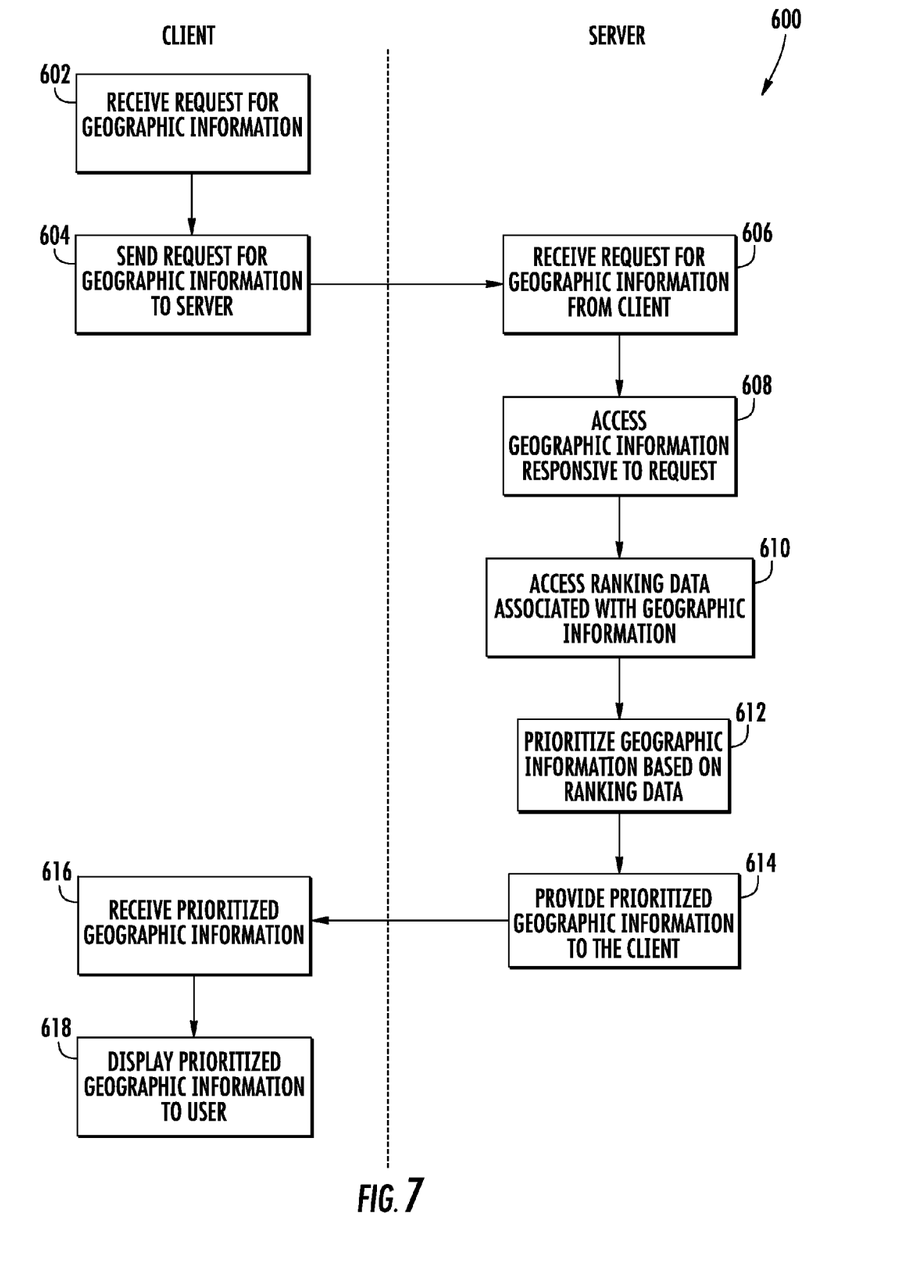
FIG. 7 depicts a flow diagram of an exemplary method according to an exemplary embodiment of the present disclosure.
Figure 8:
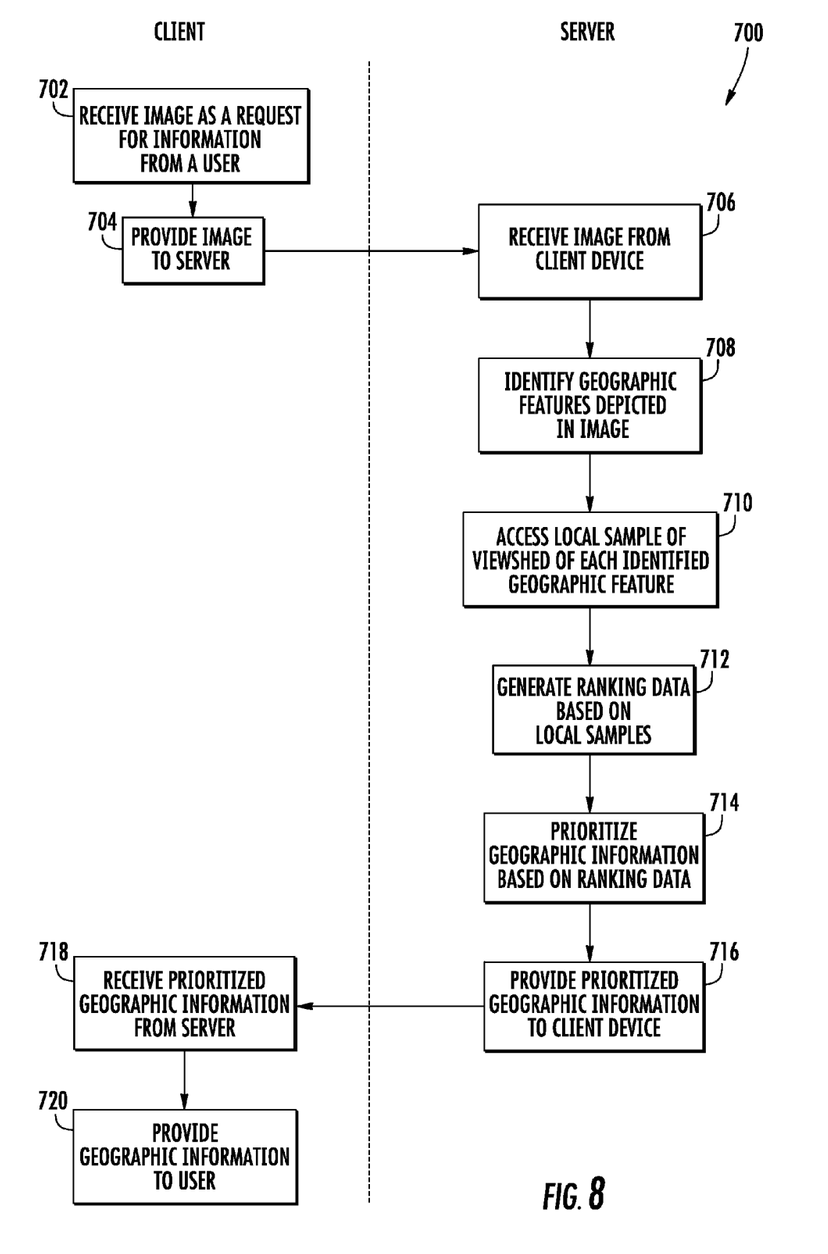
FIG. 8 depicts a flow diagram of an exemplary method according to an exemplary embodiment of the present disclosure.

FIG. 7 depicts a server-client flow diagram (600) for an exemplary method of using the ranking data in a geographic information system according to an exemplary embodiment of the present disclosure. While FIG. 8 is discussed with respect to a client-server arrangement, those of ordinary skill in the art, using the disclosures provided herein, should understand that the methods can be implemented with a single computing device or multiple computing devices as desired. At (602), a client device receives a request from a user for geographic information. For instance, a user can provide a search query, request for travel directions, request for geographic imagery, or other suitable request to the client device using an appropriate user interface. At (604), the client device sends the request for the geographic information to a server.

The server receives the request for geographic information from the client (606) and accesses geographic information responsive to the request (608). For instance, the server can access search results; geographic imagery such as street level imagery, map imagery, satellite imagery or other imagery; travel directions; or other information or data responsive to the request. At (610), the server accesses ranking data associated with the geographic information. The ranking data can include ranking scores generated for geographic features associated with the request using any of the viewshed analysis techniques discussed herein. For instance, the ranking data can include ranking scores generated by evaluating one or more characteristics of viewsheds associated with geographic features responsive to the request for geographic information.

At (612), the server prioritizes the geographic information responsive to the request based on the ranking data. For instance, the server can prioritize or order search results responsive to a search query based on the ranking data such that search results associated with geographic features having high ranking scores are prioritized over search results associated with geographic features having low ranking scores. The search results can be prioritized based solely on the ranking score or based on the ranking score in combination with other information or data.

As another example, the server can generate instructions prioritizing what information to display in association with geographic imagery responsive to the request. For instance, the server can generate instructions prioritizing text annotations to be displayed in association with geographic imagery at varying zoom levels or views of the geographic imagery based on the ranking data. In particular, text annotations associated with prominent geographic features having relatively high ranking scores can be displayed in geographic imagery at zoom levels having a relatively low level of detail. As the level of detail of the geographic imagery increases, text annotations associated with less prominent geographic features having lower ranking scores can be displayed.

At (614), the server provides the prioritized geographic information to the client device. The client device receives the prioritized geographic information (616) and provides the prioritized geographic information to the user (618). For instance, the client device can display the prioritized search results to the user. As another example, the client device can also display geographic imagery or travel directions to the user with prioritized text annotations rendered in the geographic imagery.

The flow diagram of FIG. 7 depicts the server performing the prioritizing of geographic information based on ranking data. Those of ordinary skill in the art, using the disclosures provided herein, should understand that prioritizing the geographic information based on the ranking data can similarly be performed by the client device. For instance, the server can provide geographic information and associated ranking data to the client device over a network. The client device can then prioritize the geographic information based on the ranking data and provide the prioritized geographic information to the user.

In certain applications, it can be desirable to prioritize information based on the visibility of geographic features from a restricted view direction. In other words, it can be desirable to identify which geographic feature is most prominent in a geographic area given that the feature is being viewed from a particular viewpoint or from a particular restricted view direction. In this case, the ranking data can be generated based on a local sample of the viewsheds for the geographic features.

One application where it may be desirable to generate ranking data based on a local sample of the viewsheds for geographic features is a query by photo application. A query by photo request allows a user to submit a photograph or other suitable image of a geographic area to a geographic information system. The photograph or other suitable image is then analyzed to identify features depicted in the photograph or other image. Information associated with the photograph or other image can then be provided to the user.

FIG. 8 depicts a flow diagram of an exemplary method (700) associated with an example query by photo request according to an exemplary embodiment of the present disclosure. FIG. 8 is discussed with respect to a client-server arrangement. However, those of ordinary skill in the art, using the disclosures provided herein, should understand that the methods can be implemented with a single computing device or multiple computing devices as desired.

At (702), an image such as a photograph, video, or other suitable image, is received from a user at a client device as a request for information. The image can depict a plurality of geographic features. In certain cases, the number of geographic features depicted in the image can be relatively large. In these circumstances, it can be desirable to identify only the predominate features depicted in the image and to provide information in association with the predominate features. Ranking data generated based on characteristics of viewshed information associated with the geographic features depicted in the image can be used to prioritize geographic information responsive to the request for information. At (704), the client device provides the image to the server.

The server receives the image from the client device (706) and identifies geographic features depicted in the image (708). The geographic features can be identified using suitable image and/or object recognition techniques. For instance, geographic features depicted in the image can be cross referenced with a database of imagery of geographic features and compared for similarities.

Once the geographic features are identified, information associated with the geographic features can be prioritized using ranking data generated based on viewsheds associated with geographic features. For instance, the server can access ranking data determined based on one or more characteristics of the viewsheds of the geographic features depicted in the image and prioritize the information based on the one or more characteristics of the viewshed.

As set forth above, it can be desirable to generate ranking data based on a local sample of the viewsheds for the geographic features to prioritize the depicted features based on the visibility of the features from a restricted view point. As shown in FIG. 8 at (710), a local sample of the viewshed of each identified geographic feature can be accessed. More particularly, the viewshed information previously determined for each identified feature can be accessed and local sample of the viewshed information can be extracted for analysis. The size and location of the local samples can be determined based on the view direction associated with the image. For instance, if the image depicts a view from a particular city block, the local sample of the viewsheds can be restricted to the particular city block.

Figure 9A:
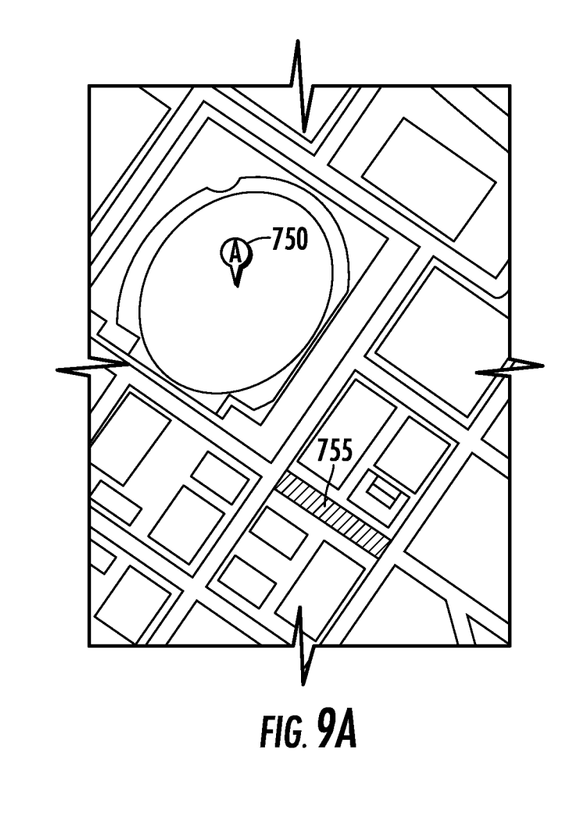
FIGS. 9A and 9B depict local samples of viewsheds for geographic features according to exemplary embodiments of the present disclosure.
Figure 9B:
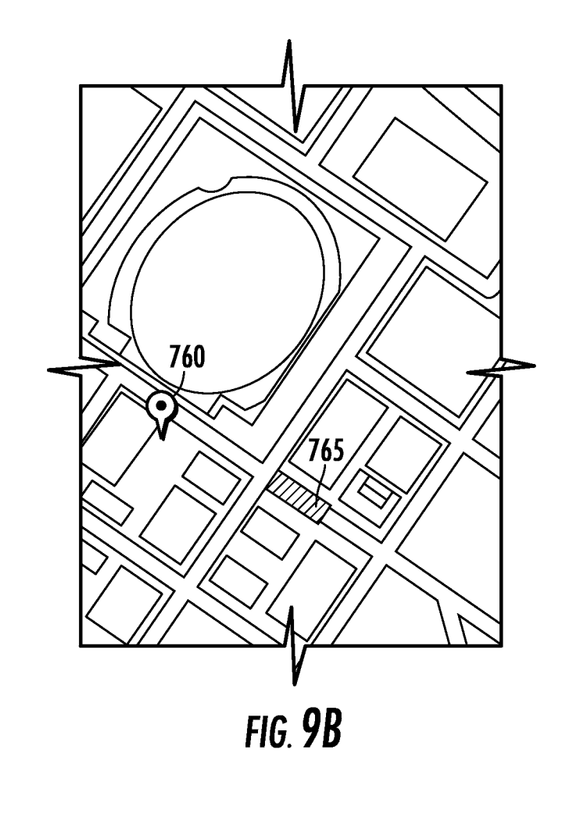

At (712), ranking data for the geographic features is generated based on the local samples. In particular, characteristics of each of the local samples are evaluated and used to generate a ranking score for the identified geographic features. For instance, the total area of the local samples of the respective viewsheds for the identified geographic features can be used to generate a ranking score for each of the identified geographic features. Geographic features having local samples with a larger total area can be assigned a higher ranking score. Geographic features having local samples with a smaller total area are assigned a lower ranking score As an example, consider FIGS. 9A and 9B which depict the local samples of viewsheds for respective geographic features 750 and 760. The local samples of the viewsheds are assessed from along a particular city block. In particular, previously determined viewshed information associated with the geographic features is accessed and a sample of the viewshed information is determined along the particular city block. As illustrated, the local sample 755 associated with geographic feature 750 depicted in FIG. 9A has greater total area than the local sample 765 associated with geographic feature 760 depicted in FIG. 9B. This is because geographic feature 750 is more visible along the particular city block than geographic feature 760. As a result, geographic feature 750 can be assigned a higher ranking score than geographic feature 760.

Once the ranking data based on the local samples has been generated, the geographic information responsive to the query by photo can be prioritized based on the ranking data (714). For instance, the server can provide instructions to display information associated with geographic features having higher ranking scores relative to geographic features having lower ranking scores.

At (716), the server provides the prioritized geographic information to the client device. The client device receives the prioritized geographic information (718) and provides the prioritized geographic information to the user (720). For instance, the client device can display the prioritized geographic information to the user. In certain implementations, the prioritized geographic information can include text annotations associated with geographic features that are overlaid on top of the original image submitted by the user in the query by photo application.

Ranking data generated based on local samples of a viewsheds can be used in applications other than query by photo applications. For example, ranking data based on local samples of viewsheds can be used to prioritize geographic information provided in a navigation application. In particular, the navigation application can generate ranking scores for geographic features based on local samples of the viewsheds along a travel route generated by the navigation application. The ranking scores generated based on these local samples can be indicative of the visibility or prominence of the geographic features along the travel route.

The viewshed information for geographic features determined according to aspects of the present disclosure can be used in association with applications other than generating a ranking score. As one example, the viewshed information can be used to determine when to display information in a mobile navigation application. The mobile navigation application can monitor the position of a user using a suitable position monitoring system or module. For instance, the position of the user can be monitored using a GPS module or can include a component for determining the position of the computing device based on signals received from one or more cell phone towers. The position of the user can be compared to the viewshed information associated with a geographic feature. If the user is at a position within the viewshed of a geographic feature, the navigation application can display information associated with the geographic feature to the user. For instance, a text annotation identifying or providing information about the geographic feature can be provided to the user. Alternatively or in addition, a three dimensional model or other image of the geographic feature can be provided to the user.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for determining ranking data for geographic features, comprising:

selecting, by one or more computing devices, a geographic feature associated with a geographic area;

determining, by the one or more computing devices, a viewshed associated with the geographic feature;

evaluating, by the one or more computing devices, one or more characteristics of the viewshed associated with the geographic feature;

generating, by the one or more computing devices, a ranking score for the geographic feature based at least in part on the one or more characteristics of the viewshed associated with the geographic feature; and storing, by the one or more computing devices the ranking score for the geographic feature in a memory;

wherein determining, by the one or more computing devices, a viewshed associated with the geographic feature comprises:

accessing, by the one or more computing devices, a three dimensional model associated with the geographic area;

identifying, by the one or more computing devices, a plurality of geographic points within the geographic area;

determining, by the one or more computing devices, whether greater than a predefined threshold of a three dimensional representation of the geographic feature in the three dimensional model is visible from each of the plurality of geographic points; and     selecting, by the one or more computing devices, the geographic point for inclusion in the viewshed associated with the geographic feature if greater than the predefined threshold of the three dimensional representation of the geographic feature is visible from the geographic point.

2. The computer-implemented method of claim 1, wherein the viewshed comprises a set of geographic points from which greater than a predefined threshold of the geographic feature is visible.

3. The computer-implemented method of claim 1, wherein evaluating, by the one or more computing devices, one or more characteristics of the viewshed comprises determining, by the one or more computing devices, a total area of the viewshed associated with the geographic feature.

4. The computer-implemented method of claim 3, wherein the ranking score is generated based at least in part on the total area of the viewshed.

5. The computer-implemented method of claim 1, wherein evaluating, by the one or more computing devices, one or more characteristics of the viewshed comprises:

identifying, by the one or more computing devices, a centroid of the viewshed associated with the geographic feature; and     determining, by the one or more computing devices, the distance of the geographic feature from the centroid of the viewshed.

6. The computer-implemented method of claim 5, wherein the ranking score is generated based at least in part on the distance of the geographic feature from the centroid of the viewshed.

7. The computer-implemented method of claim 1, wherein the ranking score for the geographic feature is determined based at least in part on the height and volume of the geographic feature.

8. The computer-implemented method of claim 1, wherein the plurality of geographic points are located along traversable paths proximate the geographic feature.

9. The computer-implemented method of claim 2, wherein the predefined threshold is based on the visible surface area of the geographic feature.

10. The computer-implemented method of claim 1, wherein the method comprises prioritizing search results or information for display in a user interface based at least in part on the ranking score.

11. A system for determining ranking data for geographic features in a geographic area, the system comprising:

one or more memory devices configured to store information associated with a geographic feature;

one or more processors configured to access the information associated with the geographic feature and to generate a ranking score for the geographic feature by determining a viewshed associated with the geographic feature and evaluating one or more characteristics of the viewshed, the viewshed comprising a set of geographic points from which greater than a predefined threshold of the geographic feature is visible, the processor further configured to store the ranking score for the geographic feature in the one or more memory devices;

wherein the processor is configured to determine a viewshed associated with the geographic feature by performing operations, the operations comprising:

accessing a three dimensional model stored in the memory associated with the geographic area;

identifying a plurality of geographic points within the geographic area;

determining whether greater than a predefined threshold of a three dimensional representation of the geographic feature in the three dimensional model is visible from each of the plurality of geographic points; and     selecting the geographic point for inclusion in the viewshed associated with the geographic feature if greater than the predefined percentage of the three dimensional representation of the geographic feature is visible from the geographic point.

12. The system of claim 11, wherein the one or more characteristics of the viewshed comprise a total area of the viewshed and a distance of the geographic feature from a centroid of the viewshed.

13. A computer-implemented method of prioritizing information in a geographic information system, comprising:

identifying, by one or more computing devices, a plurality of geographic features displayed in an image of a geographic area;

accessing, by the one or more computing devices, ranking data associated with the plurality of geographic features, the ranking data comprising a ranking score associated with each of the plurality of geographic features, the ranking score being determined based at least in part on one or more characteristics of at least a portion of a viewshed for the geographic feature; and     prioritizing, by the one or more computing devices, information associated with the plurality of geographic features for display based at least in part on the ranking data;

wherein the viewshed associated with the geographic feature is determined by performing operations, the operations comprising:

accessing a three dimensional model associated with the geographic area;

identifying a plurality of geographic points within the geographic area;

determining whether greater than a predefined threshold of a three dimensional representation of the geographic feature in the three dimensional model is visible from each of the plurality of geographic points; and selecting the geographic point for inclusion in the viewshed associated with the geographic feature if greater than the predefined threshold of the three dimensional representation of the geographic feature is visible from the geographic point.

14. The computer-implemented method of claim 13, wherein the one or more characteristics of at least a portion of the viewshed comprises at least one of the total area of the viewshed or the distance of the geographic feature from a centroid of the viewshed.

15. The computer-implemented method of claim 13, wherein the ranking data is determined based at least in part on one or more characteristics of a local sample of the viewshed associated with the geographic feature.

16. The computer-implemented method of claim 15, wherein the ranking data is determined based on the total area of the local sample of the viewshed associated with the geographic feature.

17. The computer-implemented method of claim 15, wherein the local sample is determined based on a view direction associated with the image.

18. The computer-implemented method of claim 15, wherein the local sample is determined based on a travel route.

* * * * *